Jan. 12, 1932.    G. H. KELLEY    1,840,510
HEAT INTERCHANGER
Filed March 29, 1930    2 Sheets-Sheet 1
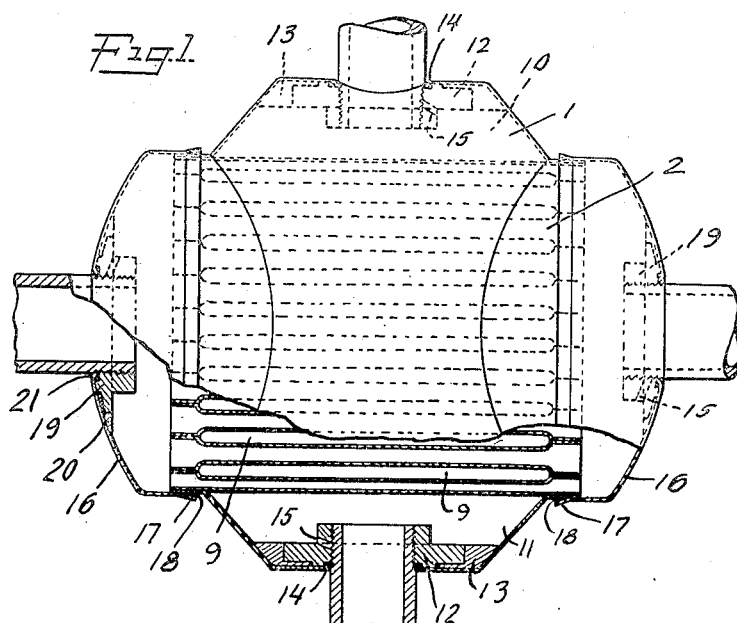
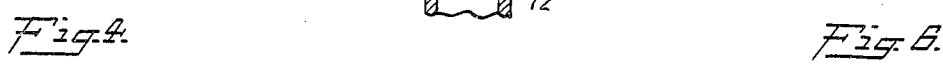
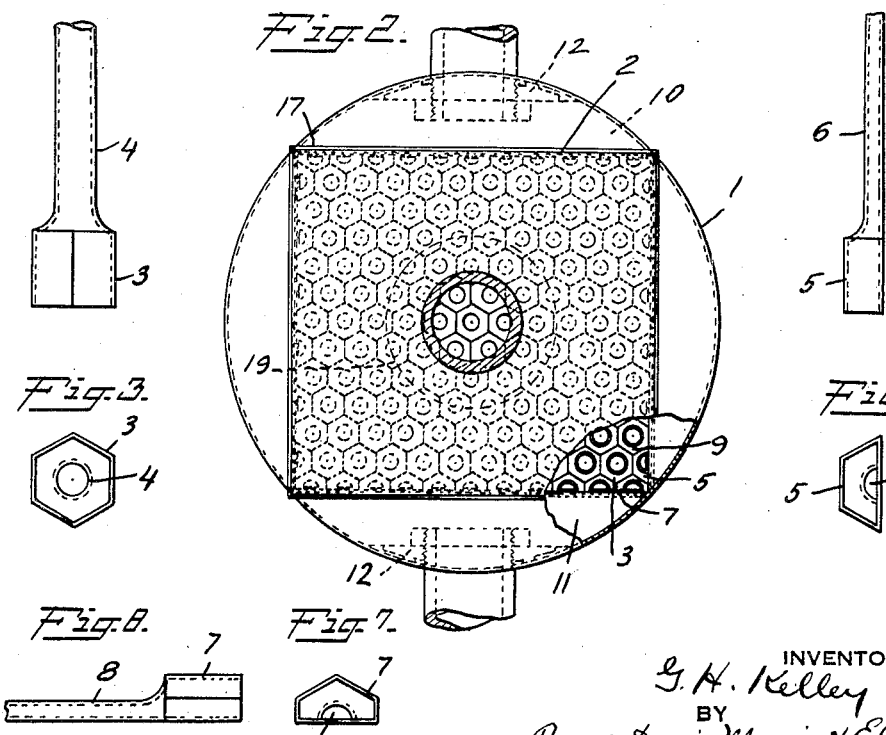
INVENTOR
G. H. Kelley
BY
Pennie, Davis, Marvin & Edmonds
ATTORNEYS Jan. 12, 1932.  G. H. KELLEY  1,840,510
HEAT INTERCHANGER
Filed March 29, 1930   2 Sheets-Sheet 2

INVENTOR
G. H. Kelley
BY
Pennie, Davis, Marvin & Edmonds
ATTORNEYS

Patented Jan. 12, 1932

1,840,510

UNITED STATES PATENT OFFICE

GEORGE HENRY KELLEY, OF NEW HAVEN, CONNECTICUT, ASSIGNOR TO WINCHESTER REPEATING ARMS COMPANY, OF NEW HAVEN, CONNECTICUT, A CORPORATION OF DELAWARE

HEAT INTERCHANGER

Application filed March 29, 1930. Serial No. 440,015.

This invention relates to heat interchangers and more particularly to an apparatus for effecting heat transfer between two fluids which must be kept separately from each other.

In carrying out my invention I provide a plurality of thin walled tubes spaced from each other throughout a portion of their lengths to provide a fluid passage around the tubes. These tubes are assembled in a matrix cylinder having suitable inlet and outlet openings communicating with the spaces around the tubes. End chamber heads are then mounted on each end of the cylinder. These end chamber heads are provided with inlet and outlet openings respectively whereby the second fluid will be passed through the tubes.

Inlet and outlet castings are arranged in the openings in the matrix cylinder and the end chamber heads and an important feature of the present invention is the method of soldering these castings in place and the method of soldering the end chamber heads to the matrix cylinder.

By means of my invention I provide a simple and inexpensive apparatus which may be used as a heat interchanger for any purpose where the difference in pressure is not excessive, and one that will perform its desired functions just as efficiently as the more expensive condenser type of construction.

In the accompanying drawings I have shown one form of the invention. In the drawings, Fig. 1 is a side elevation, parts being shown in section;

Fig. 2 is an end view;

Fig. 3 is an end view of one of the tubes arranged at a point removed from the side or top or bottom of the tube construction;

Fig. 4 is a side view thereof;

Fig. 5 is an end view of one of the tubes arranged at either side of the tube assembly;

Fig. 6 is a side elevation thereof;

Fig. 7 is an end view of one of the top or bottom tubes;

Fig. 8 is a side elevation thereof;

Figure 9:
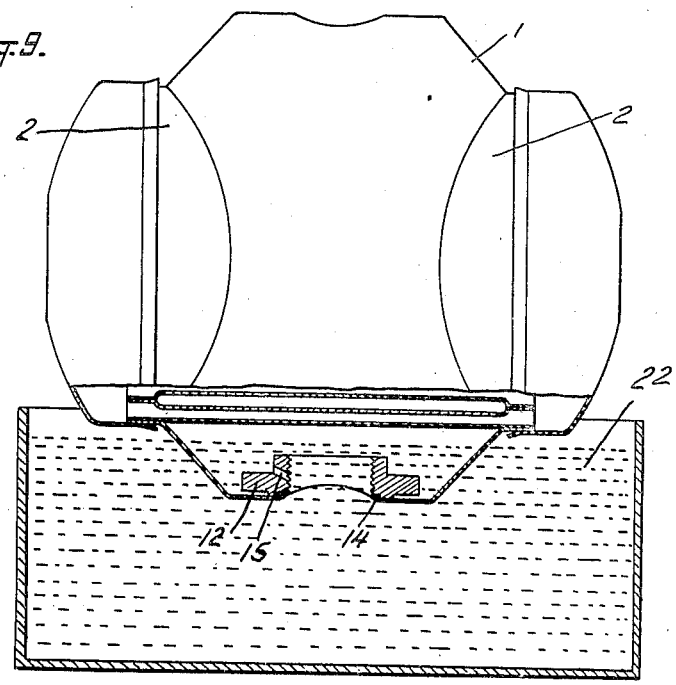
Fig. 9 is a side elevation illustrating the method of soldering outlet castings in the openings in the matrix cylinder.

Referring to the drawings, the reference numeral 1 designates generally a matrix cylinder, the opposite ends of which are squared as indicated at 2. This cylinder is adapted to support a nest of tubes which are of such construction that they are snugly received in the squared ends of the matrix cylinder but provide fluid spaces between them throughout their length. As shown (see Fig. 3) the tubes that are not arranged at either the sides or the top and bottom are provided with hexagonal shaped ends 3 and beyond the ends the tubes are reduced in cross section as at 4 (see Fig. 4) and may be of any desired shape but are preferably circular. In order to fit the square end of the matrix cylinder, alternate side tubes are shaped as indicated at 5 in Fig. 5 of the drawings and these tubes are also reduced in cross section throughout their length as indicated at 6 and may be semi-circular in cross section. Likewise the tubes contacting with the top and bottom walls are shaped as indicated at 7 in Fig. 7 of the drawings at each end and the intermediate portions of these tubes are reduced in cross section as indicated at 8. This provides a tube structure, the ends of which are snugly received in the squared ends 2 of the matrix cylinder but which provides fluid spaces 9 between the tubes throughout the lengths of the tubes. The matrix cylinder is provided with chambers 10 and 11, one of which serves as an inlet chamber for the fluid circulating through the fluid space 9 and the other of which serves as an outlet chamber. The chambers are provided with openings adapted to receive outlet and inlet castings 12. These castings are retained in place by solder 13 and the portion of the matrix cylinder surrounding the casting may be crimped as at 14 into the groove arranged on the outer face of the matrix of the casting. The casting is also provided with a passage 15 through which excess solder is adapted to flow.

End chamber heads 16 are arranged on the squared ends 2 of the matrix cylinder and are provided with flanges 17 which fit over the squared portion of the matrix cylinder and form a pocket to receive solder 18 as shown in Fig. 1 of the drawings. Each of these end chamber heads is provided with an opening for the reception of inlet and outlet castings 19 whereby the fluid passing through the tubes may be conveyed to and from the heat interchanger. The castings are held in place by solder as indicated at 20 and are centralized in the openings by crimping the end chamber head around the opening into a groove in the casting as indicated at 21.

Figure 10:
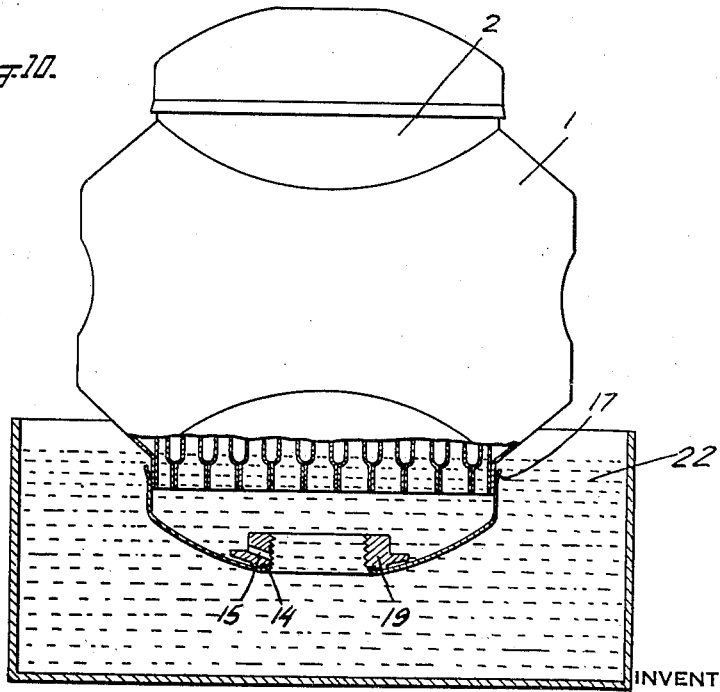
Fig. 10 is a similar view illustrating the method of soldering the end chamber head to the matrix cylinder and soldering outlet castings in the opening thereof.

In assembling the heat interchanger the tubes are first placed in the matrix cylinder. The ends of the tubes fit tightly in the squared ends of the matrix cylinder and hold themselves in place. The inlet and outlet castings 12 may be put in place in the cylinder either before or after putting in the tubes. They may be temporarily held in their proper position by spot welding or other suitable method. The end chamber heads may then be secured to the central section and the inlet and outlet castings 19 may be placed in their proper positions in the openings in the end chamber heads. The inlet and outlet portions of the matrix cylinder are then each dipped in a soldering bath 22 as indicated in Fig. 9 of the drawings. The excess solder flows out through the passage 15 in the casting leaving an amount of solder as indicated at 13 in Fig. 1 of the drawings. In dipping the inlet and outlet castings 12 into the solder bath the heat interchanger is dipped to about the level indicated in Fig. 9 of the drawings so that none of the solder gets on the tubes. End chamber heads and their inlet and outlet castings are then soldered by dipping as indicated in Fig. 10 of the drawings. The device is dipped into the solder to a sufficient depth that the flange 17 is below the level of the solder bath which causes the solder to be pocketed between this flange and the end 2 of the matrix cylinder forming the soldered connection indicated at 18 in Fig. 1 of the drawings. As the device is raised from the solder bath excess solder drains through the opening 15 in the casting forming a soldered connection between the casting and the end chamber head as indicated at 20 in Fig. 1 of the drawings.

In assembling the apparatus the outlet castings 12 may be soldered in place before the end chamber heads are applied, or the end chamber heads may be first applied with the various castings temporarily held in place and then all of the castings soldered in place and the end chamber heads soldered to the ends of the matrix.

I claim:

1. A heat interchanger comprising a matrix cylinder having an inlet opening and an outlet opening, the ends of said matrix cylinder being reduced in size and being squared in cross section, a nest of thin walled tubes arranged in said matrix cylinder, said tubes being provided with enlarged ends adapted to fit snugly in the ends of said matrix cylinder, and end chamber heads secured to said matrix cylinder, each of said end chamber heads being provided with an opening.

2. A heat interchanger comprising a matrix cylinder having an inlet opening and an outlet opening, the ends of said matrix cylinder being reduced in size and being of polygonal cross section, a nest of thin walled tubes arranged in said matrix cylinder, said tubes having enlarged ends fitting snugly in the ends of said matrix cylinder, and end chamber heads fitting over the ends of said matrix cylinder, each of said end chamber heads being provided with an opening.

In testimony whereof I affix my signature.

GEORGE H. KELLEY.